United States Patent [19]

Hoogenberg

[11] Patent Number: 5,601,507
[45] Date of Patent: Feb. 11, 1997

[54] MECHANICAL GEARING

[76] Inventor: Heerke Hoogenberg, Eshuisstraat 4, NL-7462, RA Rijssen, Netherlands

[21] Appl. No.: 525,548

[22] PCT Filed: Mar. 17, 1994

[86] PCT No.: PCT/NL94/00061

§ 371 Date: Nov. 30, 1995

§ 102(e) Date: Nov. 30, 1995

[87] PCT Pub. No.: WO94/21940

PCT Pub. Date: Sep. 29, 1994

[30] Foreign Application Priority Data

Mar. 19, 1993 [NL] Netherlands ............................ 9300492

[51] Int. Cl.[6] ........................................................... F16H 1/32
[52] U.S. Cl. ........................ 475/165; 475/169; 475/170; 476/72
[58] Field of Search ................................... 475/162, 165, 475/166, 169, 170; 476/67, 72

[56] References Cited

U.S. PATENT DOCUMENTS

| | | | |
|---|---|---|---|
| 827,204 | 7/1906 | Bauch | 476/67 X |
| 1,801,939 | 4/1931 | Sopkin et al. | 476/67 |
| 1,843,426 | 2/1932 | Lee | 476/72 X |
| 2,024,459 | 12/1935 | Lee | 476/67 X |
| 2,831,373 | 4/1958 | Weis | 475/166 |
| 4,109,541 | 8/1978 | Jesse | 475/166 |
| 4,435,998 | 3/1984 | Kinoshita | 476/67 X |
| 4,924,730 | 5/1990 | Parsons | 475/166 |
| 4,995,279 | 2/1991 | Parsons | 475/170 X |
| 5,013,288 | 5/1991 | Parsons | 475/166 |
| 5,071,393 | 12/1991 | Genovese | 475/166 |
| 5,145,468 | 9/1992 | Nagabhusan | 475/170 |

Primary Examiner—Charles A. Marmor
Assistant Examiner—Peter Kwon
Attorney, Agent, or Firm—Evenson, McKeown, Edwards & Lenahan

[57] ABSTRACT

The invention relates to a mechanical gearing. This comprises a frame, a first shaft mounted rotatably on the frame and carrying a pair of friction wheels which are disposed at a distance from each other and which have mutually facing friction surfaces together converging outward, a second shaft which is mounted on the frame parallel to but eccentrically relative to the first shaft and which carries a friction wheel which has an internal annular friction surface situated axially between the friction wheels of the first shaft, and a closed belt of mutually abutting push links. The belt forms on mutually opposite sides surfaces co-acting with the pair of friction wheels and on a radially outermost surface forms a surface co-acting with the single belt engaging wheel.

7 Claims, 6 Drawing Sheets

5,601,507

MECHANICAL GEARING

BACKGROUND AND SUMMARY OF THE INVENTION

The invention relates to a mechanical gearing with which a fixed or variable transmission ratio can be adjusted between two rotating members.

The invention relates particularly to a mechanical gearing wherein forces are transmitted by friction. A known gearing of this type makes use of two pairs of V-belt pulleys of variable width and a so-called push belt arranged therebetween and comprising abutting links. The construction of the known push belt imposes limitations with respect to the torque that can be transmitted with the gearing.

The present invention has for its object to provide a mechanical gearing of the said type with which a large torque can be transmitted.

This object is achieved in a mechanical gearing as characterized in claim 1. The belt of push links is enclosed all round by the friction bevel gears whereby great forces can be transmitted without the belt being disturbed or damaged. The belt can be in contact over a large angle with both the pair of friction wheels and the single friction wheel so that a large couple can be transmitted.

The gearing according to the invention can be used for adjusting a fixed gearing but can likewise be embodied for adjusting a variable gearing. In this case the steps of claim 2 are applied.

A favourable embodiment is therein characterized in claim 3. When the eccentricity of the shafts is varied the relevant axial distance of the two associated friction wheels is therein adjusted automatically. When the axial distance is increased the two friction wheels of the pair are pressed away from each other and the belt will run at a greater diameter, so that a larger transmission ratio is adjusted from the first to the second shaft.

The mechanical gearing according to the invention can be applied as gearing step in very many different embodiments of mechanical gearings. The gearing according to the invention can in principle be applied in any configuration as tooth wheel transmissions.

A suitable embodiment is therein characterized in claim 4. With gearing steps thus connected in series a very high or low transmission can be adjusted.

A favourable further development is herein characterized in claim 5. It is hereby possible to arrange the input and output shaft of a gearing coaxially, which is desirable in a number of applications.

The gearing according to the invention is preferably equipped with a push belt as characterized in claim 6. Because the push belt is supported over its whole periphery, partly by the friction wheels and partly by the belt engaging wheel, the push belt does not itself have to be able to form a stiff portion as is the case in the known art. By connecting the push links together by pivot shafts the mutual rotation which takes place at the transition from the friction wheels to the belt engaging wheel and vice versa can take place with very little friction, whereby the performance of the gearing is high.

The step of claim 7 is therein preferably applied. The friction hereby becomes extremely low, with the associated positive effect on the performance of the gearing.

The invention will be further elucidated in the following description with reference to the embodiments shown in the figures.

DETAILED DESCRIPTION OF THE PREFERRED EMBODIMENTS

Figure 1:
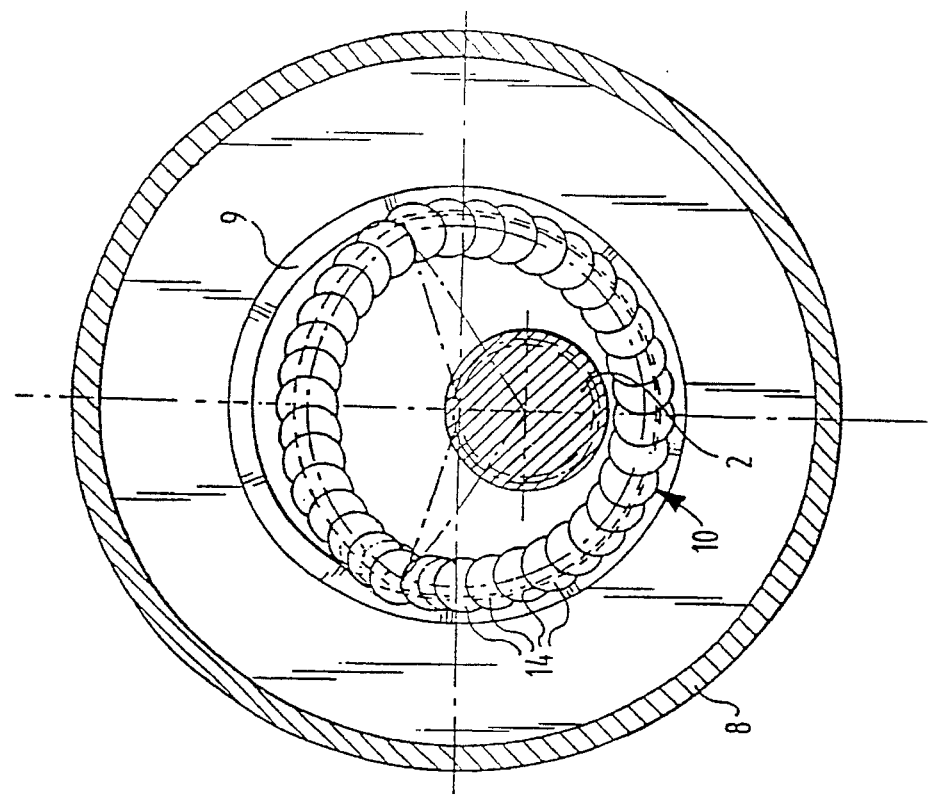
FIG. 1 shows a lengthwise section of a schematized embodiment of the gearing according to the invention in a basic embodiment.

The gearing 1 shown schematically in FIG. 1 comprises a first shaft 2 on which is arranged a pair of friction wheels 3, 4 disposed at a distance from each other. These friction wheels 3, 4 have mutually facing friction surfaces 5, 6 respectively which converge in axially outward direction.

The gearing 1 further comprises a second shaft 7 which carries a friction wheel 8 with an internal annular friction surface 9 which, as FIG. 1 shows, is situated axially between the friction wheels 3, 4 of the first shaft 2.

To transmit a force between the shafts 2 and 7 is arranged a closed belt 10 of mutually abutting push links 14. As shown in FIG. 1, the push links 14 are embodied such that on oppositely located sides 11 of the belt are formed surfaces co-acting with the friction surfaces 5, 6 of the pair of friction wheels 3, 4. Formed in the radially outermost plane of the belt 10 is an, in this embodiment, V-shaped engaging surface 12 which co-acts with the likewise V-shaped friction surface 9 of friction wheel 8.

Figure 2:
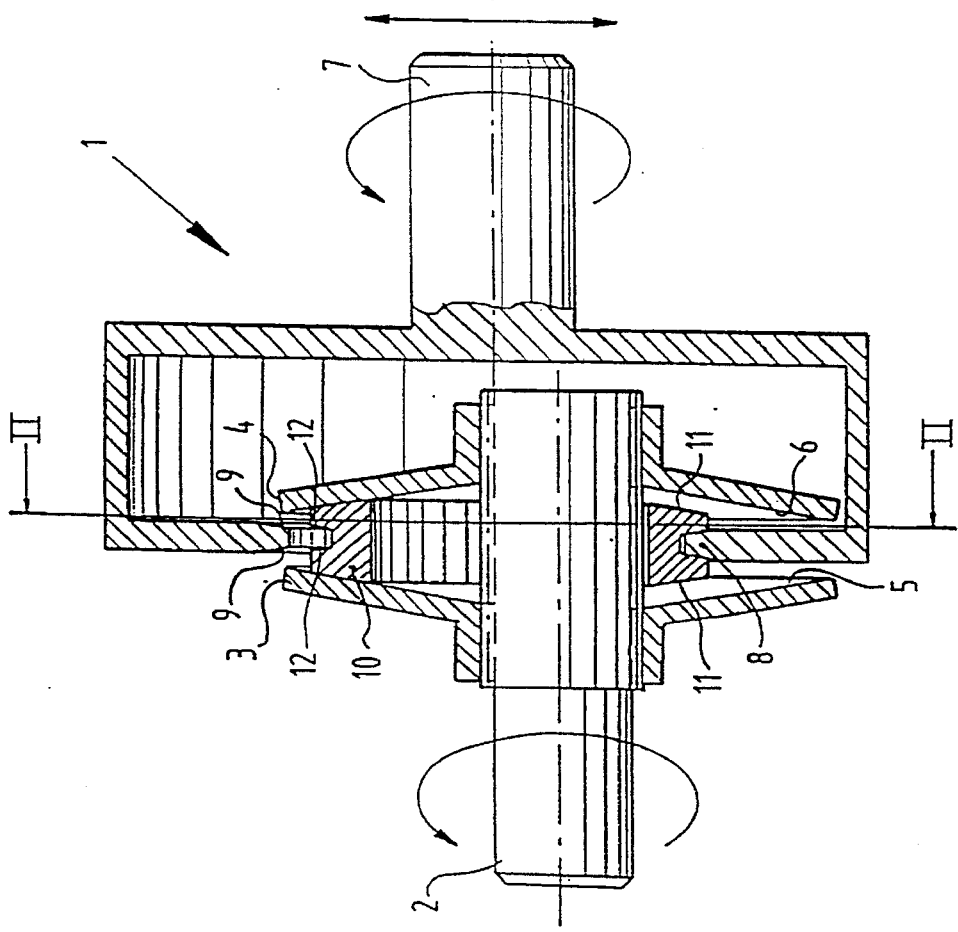
FIG. 2 shows a section along arrow II—II in FIG. 1.

As shown in FIG. 2, the links 14 of the belt 10 are movable relative to each other since in the cross section shown in FIG. 2 they have a substantially cylindrical outer surface which fits into a cylindrical recess of an abutting link.

A lower portion of the belt 10 is, as shown in FIG. 2, in engagement with friction wheel 8, while an upper portion is in engagement with the friction wheel pair 3, 4. It can be seen that the belt 10 is in contact on a larger diameter with wheels 3, 4 than with wheel 9. This implies that when shafts 2, 7 rotate the first shaft 2 will have a greater rotation speed than the second shaft 7.

It will be apparent that when the eccentricity between the first shaft 2 and the second shaft 7 is reduced and the friction wheels 3, 4 are simultaneously moved toward each other in order to keep the belt enclosed in the described manner, the contact diameter on the friction wheels 3, 4 becomes smaller so that at the same rotation speed of the first shaft 2 the rotation speed of the second shaft 7 decreases further.

A variable gearing can thus be obtained by control means with which the axial distance of the pair of friction wheels 3, 4 and the eccentricity of the first shaft 2 and the second shaft 7 are varied simultaneously. A useful embodiment herein is when the friction wheels 3, 4 are continually urged toward each other by spring-mounted means so that at all times a sufficient pressure is adjusted on the side surfaces of the belt, and as reaction a sufficient contact pressure is adjusted between the belt and the second friction wheel. For the gearing variation only the eccentricity then has to be controlled.

It is evident that the gearing 1 is mounted in a frame such as a closed casing in which the shafts 2 and 7 are bearing mounted. The means for adjusting the eccentricity can be realized in any random manner such as, in per se known manner, by mounting the shaft 7 eccentrically in a bushing which in turn is itself mounted eccentrically in a bushing which is for instance coaxial with the first shaft 2. Instead of an eccentric bearing mounting of the second shaft 7 the first shaft 2 can of course be mounted adjustably eccentrically.

The gearing shown schematically in FIGS. 1 and 2 can be embodied as gearing step in any desired assembly with corresponding gearings or other, such as tooth wheel, gearings in order to obtain a total gearing suitable for a particular application.

Figure 3:
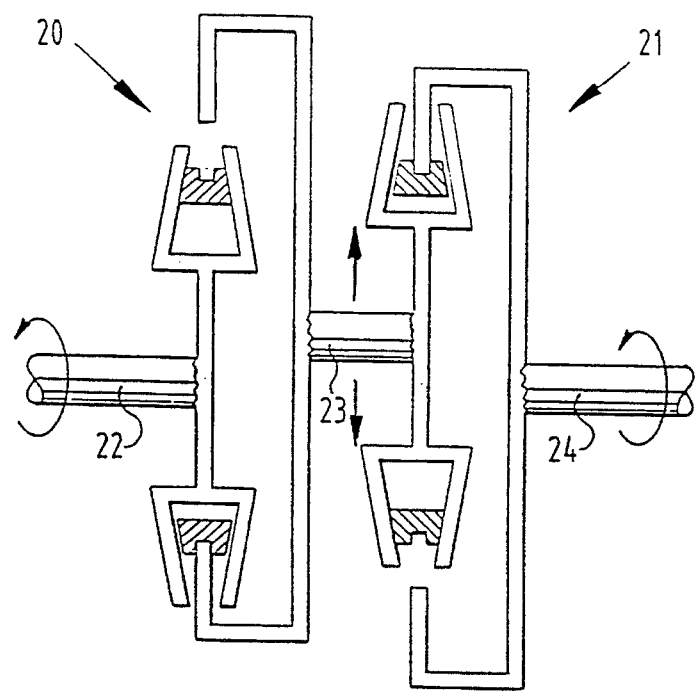
FIG. 3–5 show diagrams of three possible compound gearings according to the invention.

FIG. 3 shows for instance an embodiment wherein two gearings 20, 21 of the type shown in FIGS. 1 and 2 are combined. The second shaft of the gearing 20 is fixedly connected to the first shaft of gearing 21 to form an intermediate shaft 23. The second shaft 24 of the second gearing step 21 is mounted coaxially with the first shaft 22 of the first gearing 20, so that the gearings 20, 21 have the same but opposing eccentricity. By varying the eccentricity of the intermediate shaft 23 the gearing is varied in the manner described with reference to FIG. 1. As the eccentricity increases the transmission ratio for both gearings 20, 21 increases, that is, the ratio between the rotation speeds of the shafts 22, 23 and 23, 24 increases proportionally so that the ratio between the rotation speeds of the shafts 22 and 24 increases at a proportional acceleration.

Figure 4:
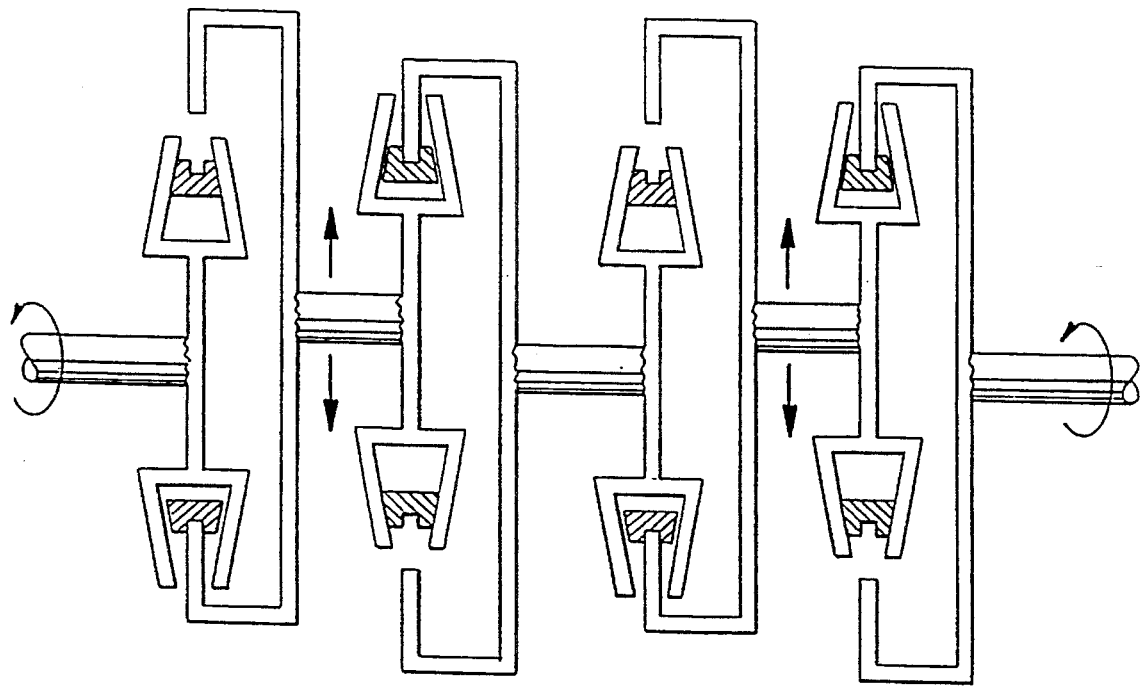

FIG. 4 shows a gearing assembled from four gearing steps. This gearing Can be seen as a double embodiment of the gearing of FIG. 3, so that with a variation of the eccentricity of the two pairs of gearings a considerable variation occurs in the transmission ratio.

Figure 5:
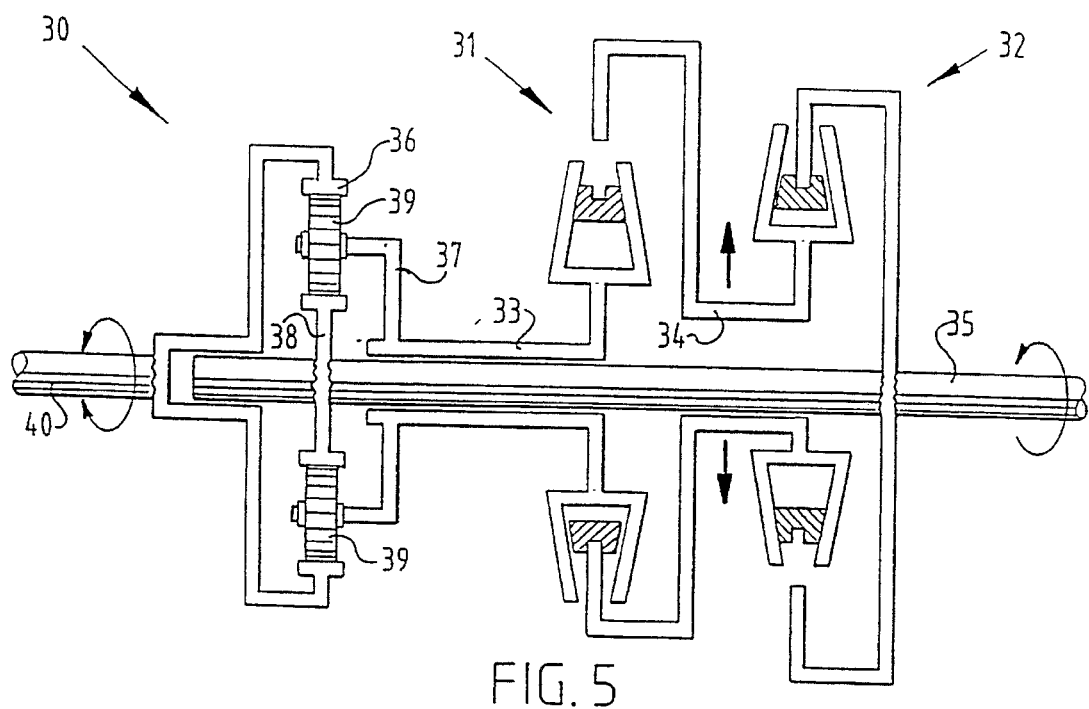

FIG. 5 shows a compound gearing consisting of a combination of a planetary gearing with a double gearing step according to the invention. The part assembled from the two steps 31, 32 according to the invention corresponds substantially with the gearing shown in FIG. 3. Here also the second shaft of the first step 31 and the first shaft of the second step 32 are mutually connected to form an intermediate shaft 34. Between the first shaft 33 of the first step 31 and the second shaft 35 of the second step 32 a transmission ratio applies which is adjustable through setting of the eccentricity of intermediate shaft 34.

As shown, the first shaft 33 of the assembly 31, 32 is coupled to the planetary carrier 37 of the planetary system. The second shaft 35 of assembly 31, 32 is coupled to the sun wheel 38. The ring wheel 36 is connected to the, in this embodiment, output shaft of the whole gearing 30. Mounted in the usual manner on the planetary carrier 37 is a number of planetary wheels 39 Which are in engagement with both sun wheel 38 and ring wheel 36.

When in the gearing 30 the shaft 35 is seen as input shaft and shaft 40 as output shaft, it is possible with a suitable choice of the transmission ratio of the planetary system and of the adjustability of the gearing by the steps 31, 32 to embody the gearing 30 such that the output shaft 40 can stand still relative to shaft 35 and can rotate in two directions. Standstill of the output shaft 40 when input shaft 35 is rotating occurs when, by means of the eccentricity setting of intermediate shaft 34, the rotation speeds of shaft 33 and shaft 35 are in the proportion of the number of teeth of the sun wheel and the ring wheel together to the number of teeth of the sun wheel.

Figure 6:
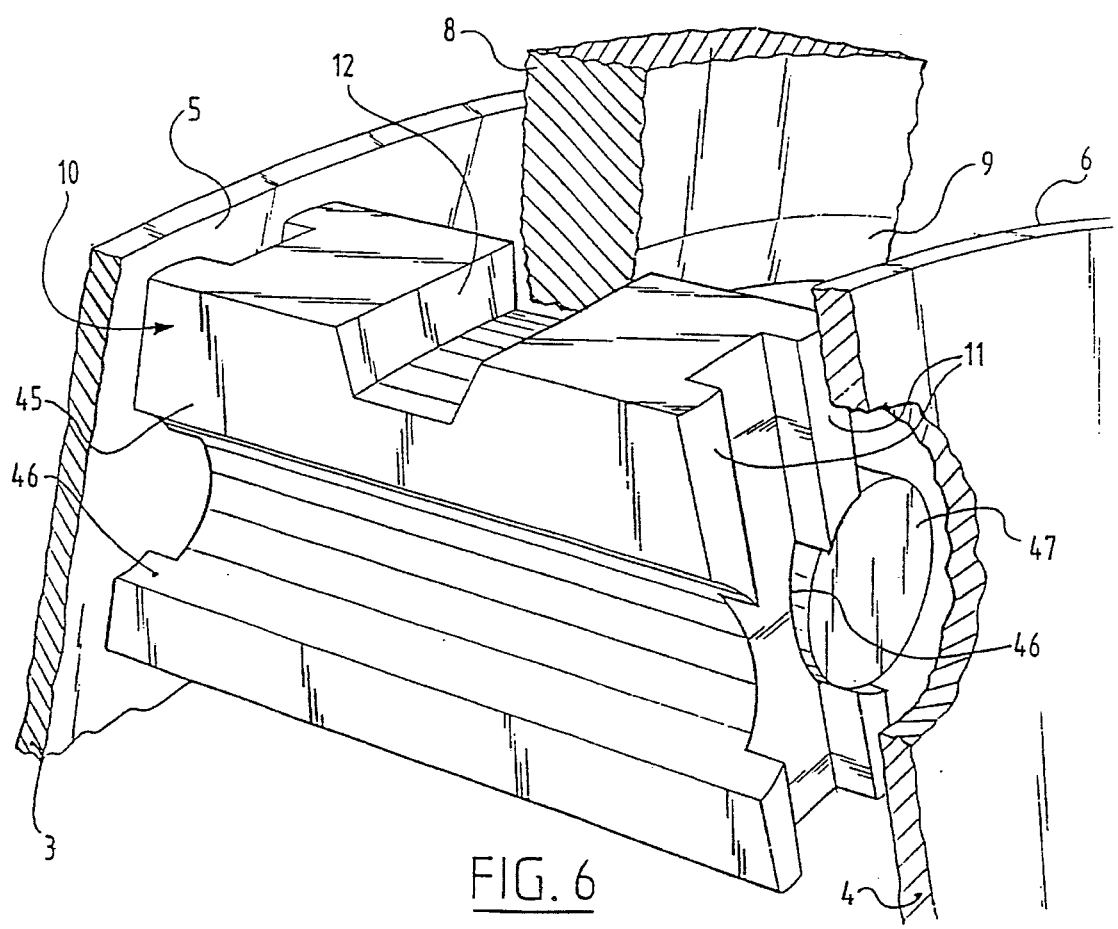
FIG. 6 is a perspective view of a part of the device to elucidate the engagement of the push belt.

FIG. 6 shows in perspective view a part of the gearing according to the invention to elucidate the co-action between the friction wheels, the push belt and the belt engaging wheel. In FIG. 6 is shown an embodiment of the push belt different from that in FIGS. 1 and 2. However, corresponding components have been given the same reference numerals.

It can be seen in FIG. 6 that the link 45 of the push belt is provided on its sides with side surfaces 11 which can be in frictional engagement with the friction surfaces 5, 6 of the respective friction wheels 3, 4. The outer surface 12 is a truncated V-shaped groove in which the friction surface 9 of friction wheel 8 engages.

Each link 45 is provided on either side with a part-cylindrical cavity 46. A pivot shaft 47 is arranged between two adjoining links 45, whereby the two adjoining links 45 can pivot relative to each other round the centre line of this shaft 47.

Figure 7:
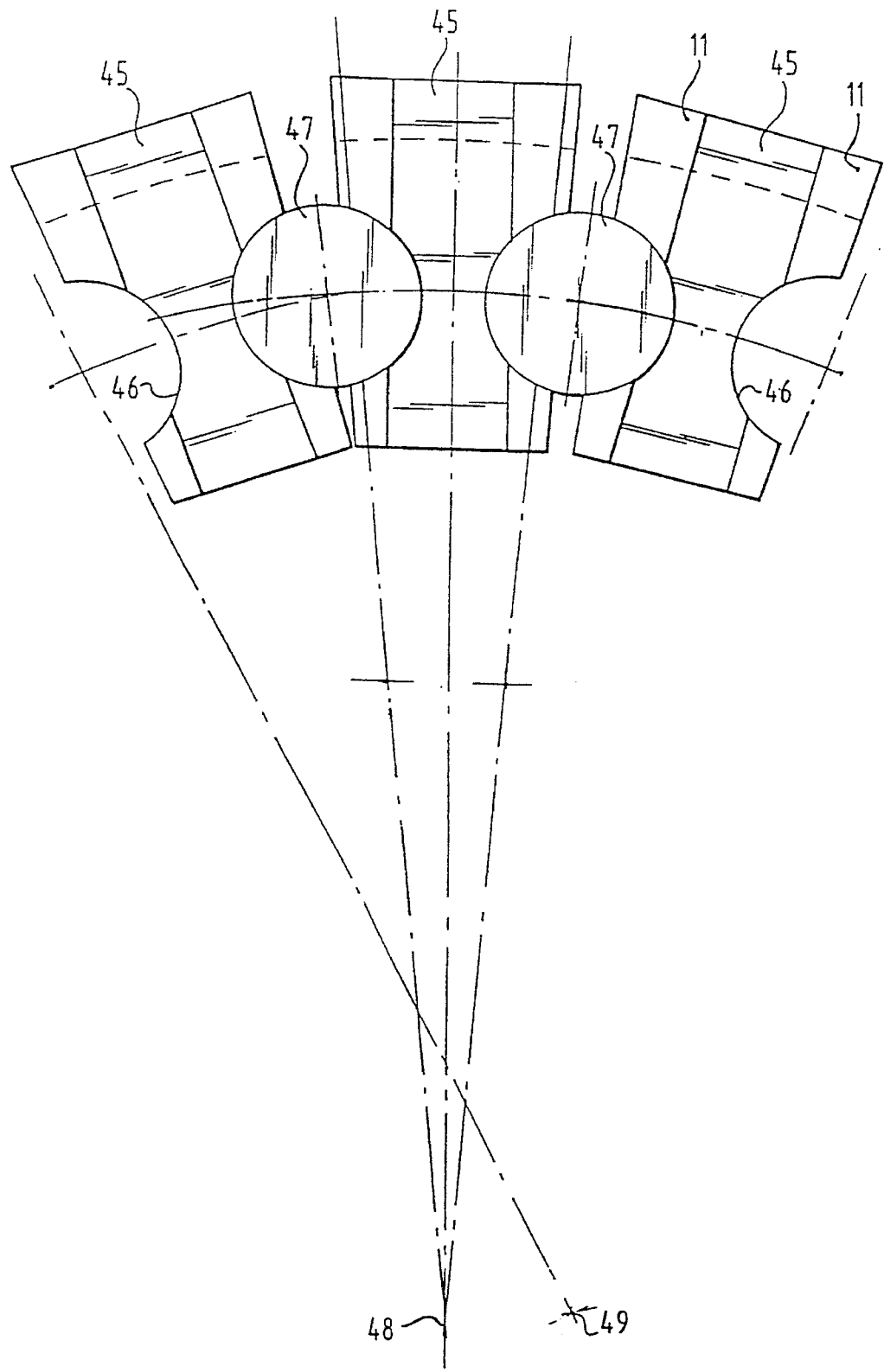
FIG 7 shows in side view a part of the push belt shown in FIG. 6.

FIG. 7 shows three links of the push belt of FIG. 6 in the transition from the contact with the friction wheels to the contact with the belt engaging wheel. The two right-hand links are in contact with the friction wheel pair 3, 4 and thus move, without mutual shifting, round the centre of shaft 2 designated with 48. The link drawn on the left in FIG. 7 is in contact with the belt engaging wheel 8 and will perform a circular movement with as centre the point 49 shown in FIG. 7 which designates the centre of shaft 7. Only at the transition from the contact with the friction wheel pair to the contact with the belt engaging wheel and vice versa does a mutual movement of the adjoining links take place. As is shown clearly in FIG. 2, these pivot on the shaft 47 at this transition lying between the two left-hand links.

Figure 8:
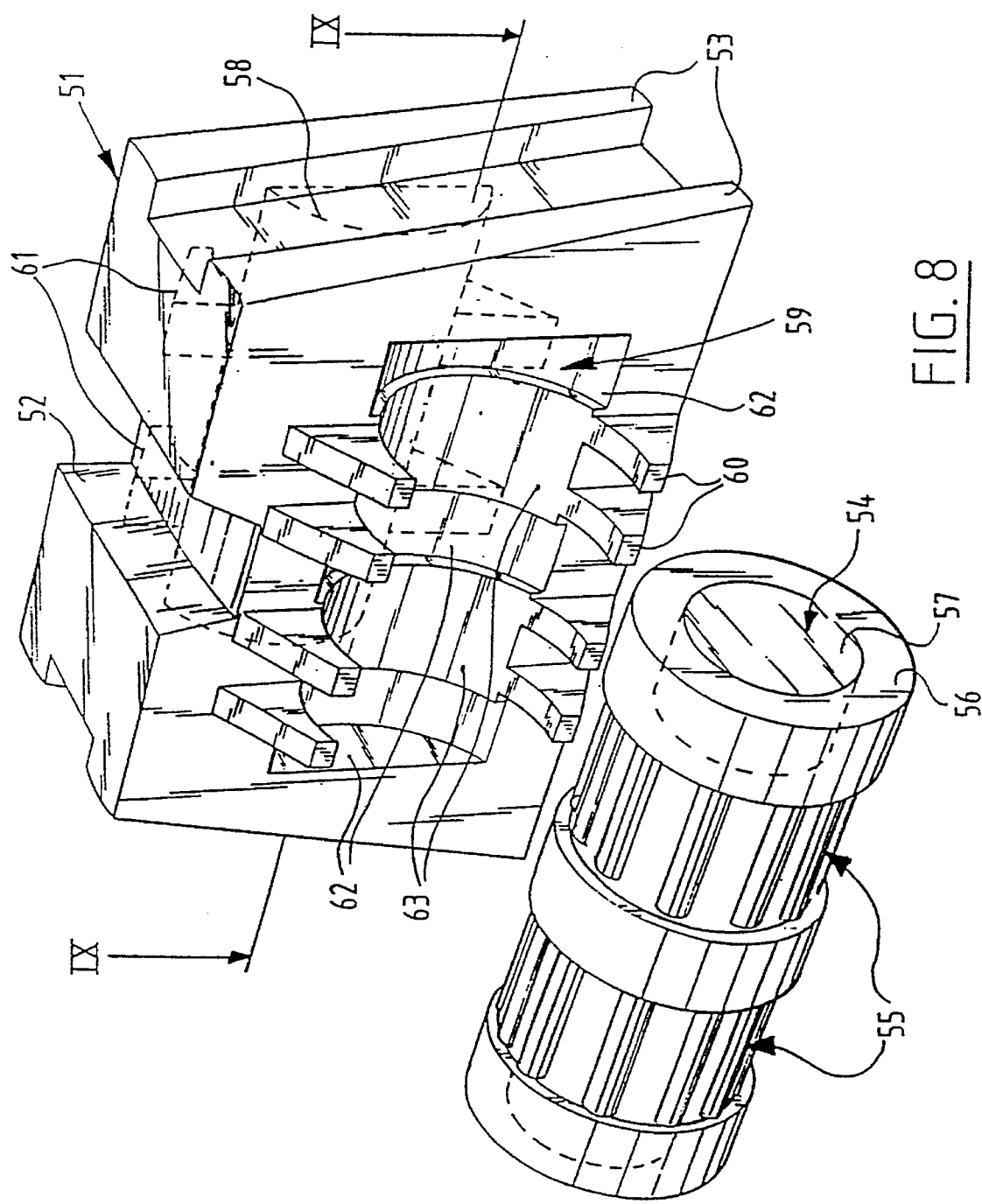
FIG. 8 shows a push belt link with pivot shaft according to a preferred embodiment of the invention.
Figure 9:
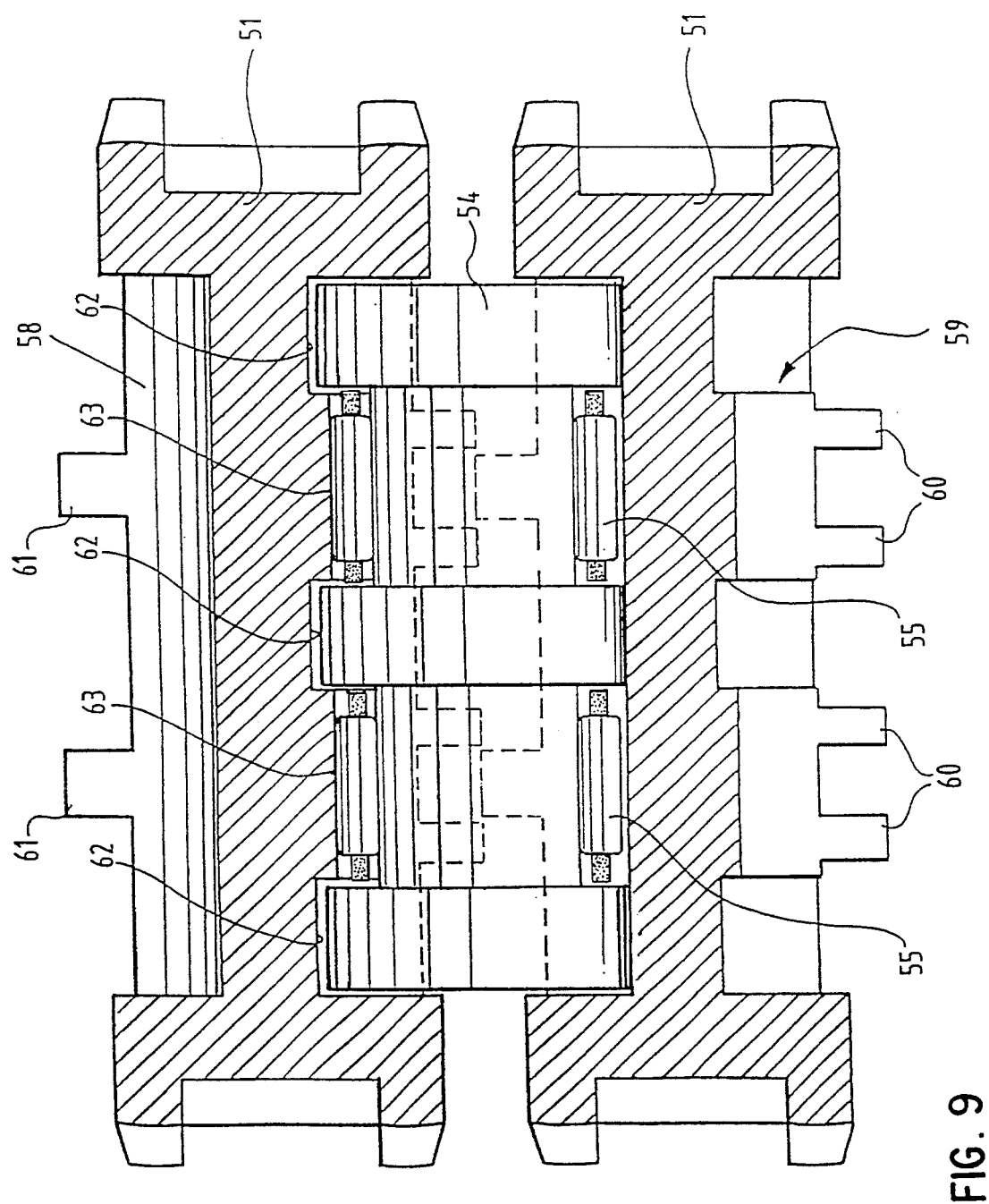
FIG. 9 shows a section along arrow IX—IX in FIG. 8.

FIGS. 8 and 9 show a further developed favourable embodiment of the push belt. The link 51 is here embodied substantially the same as link 45 of the foregoing figures. Here also is a groove 52 in the top surface for co-action with the belt engaging wheel and mutually opposite converging side surfaces 53 for co-action with the friction wheel pair. The successive links 51 lie against each other via a pivot shaft 54 which is provided here with needle bearings 55. Pivot shaft 54 is built up of a core 57 with a central portion having a larger diameter, on side shaft ends of which are arranged the needle bearings 55 and end rings 56. The rings 56 are mounted on core 57 with a wringing fit.

The links 51 are provided with cavities 58, 59 on either side which differ from each other. Cavity 58 is in each case part-cylindrical, as FIG. 9 clearly shows. The diameter of this part-cylindrical cavity 58 corresponds with the diameter of the central portion and the rings 56 of shaft 54, so that these can lie close-fittingly therein.

On the opposite side of the link 51 the groove 59 is provided with three part-cylindrical chambers 62 at the position of the end rings 56 and the central portion of shaft 54. Formed between these chambers 62 are two part-circular bearing surfaces 63 with a diameter such that they can co-act with the needle bearings 55. The effective outer diameter of needle bearings 55 is smaller in this embodiment than that of the end rings 56 and the central portion of shaft 54. The needles of the needle bearing thus run freely in the cavity 58 without contact with the link.

The chambers 62 each have a larger diameter than the end rings 56 and the central portion of shaft 54, so that these parts run freely in the cavity 59 of link 51.

During mutual pivoting of two adjoining links 51 the shaft 54 thus moves as one whole with the link 51, the continuous cavity 58 of which is in contact with shaft 54. As seen in FIG. 9, this is the bottom link 51. The other link rests against the needle bearings 55 so that the pivoting movement of the two links in relation to each other therefore takes place due to needle bearings 55 with very little friction.

The links 51 are provided on either side with mutually engaging fingers 60 and 61 which ensure complete enclosing of the shaft 54 between two adjoining links 51.

The figures and the description thereof are only intended as elucidation of the principle forming the basis of the invention and cannot be interpreted as limiting in any way whatever. As noted above, the gearing according to the invention can be embodied in countless different ways and combined with similar or other gearing steps. The belt engaging wheel is thus not necessarily a friction wheel. It is equally possible to embody this as tooth wheel, wherein the links are provided with corresponding tooth members co-acting therewith.

I claim:

1. Mechanical gearing comprising a frame, a first shaft mounted rotatably on the frame and carrying a pair of friction wheels which are disposed at a distance from each other and which have mutually facing friction surfaces together converging outward, a second shaft which is mounted on the frame parallel to but eccentrically relative to the first shaft and which carries a belt engaging wheel which has an annular belt engaging surface situated axially between the friction wheels of the first shaft, and a closed belt of mutually abutting push links, which belt forms on mutually opposite sides surfaces co-acting with the pair of friction wheels and on a radially outermost surface forms a surface co-acting with the single belt engaging wheel.

2. Gearing as claimed in claim 1, wherein control means are present for varying the axial distance of the pair of friction wheels and the eccentricity of the first and the second shaft.

3. Gearing as claimed in claim 2, wherein the pair of friction wheels are continually urged toward each other by spring-mounted means and the control means varies the eccentricity of the shafts.

4. Gearing comprising a number of steps of gearings as claimed in claim 1, wherein the second shaft of a gearing step is coupled in each case to the first shaft of a following gearing step.

5. Gearing as claimed in claim 4, wherein the eccentricity of two successive gearing steps is identical but opposed.

6. Gearing as claimed in claim 1, wherein the push links are mutually connected by pivot shafts.

7. Gearing as claimed in claim 6, wherein the pivot shafts comprise needle bearings.

\* \* \* \* \*